United States Patent
Zhao et al.

(10) Patent No.: US 11,270,042 B2
(45) Date of Patent: Mar. 8, 2022

(54) MACHINE LEARNING BASED FLUID SIMULATION

(71) Applicant: INTERNATIONAL BUSINESS MACHINES CORPORATION, Armonk, NY (US)

(72) Inventors: Kun Zhao, Funabashi (JP); Takayuki Osogami, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 702 days.

(21) Appl. No.: 16/245,883

(22) Filed: Jan. 11, 2019

(65) Prior Publication Data

US 2020/0226224 A1 Jul. 16, 2020

(51) Int. Cl.
*G06F 9/44* (2018.01)
*G06F 30/20* (2020.01)
*G06N 20/00* (2019.01)
*G06F 17/18* (2006.01)
*G06N 3/04* (2006.01)

(52) U.S. Cl.
CPC .............. *G06F 30/20* (2020.01); *G06F 17/18* (2013.01); *G06N 3/0472* (2013.01); *G06N 20/00* (2019.01)

(58) Field of Classification Search
CPC ....................................................... G06F 30/20
USPC ............................................................ 703/9
See application file for complete search history.

(56) References Cited

U.S. PATENT DOCUMENTS

| 9,187,984 B2 * | 11/2015 | Usadi .................... G06N 3/0427 |
| 2015/0227651 A1 * | 8/2015 | Gowaikar ............... G06F 30/20 |
| | | 703/2 |
| 2018/0004865 A1 * | 1/2018 | Borrel ..................... E21B 41/00 |
| 2018/0173823 A1 | 6/2018 | Satoh et al. |

OTHER PUBLICATIONS

Zhao, Kun et al., "Modeling fluid simulation with dynamic Boltzmann machine," Simulation Conference (WSC), IEEE, Dec. 2017, pp. 4503-4505.

Price, Daniel J., "Smoothed particle hydrodynamics and magnetohydrodynamics," Journal of Computational Physics, Feb. 2012, pp. 759-794, 231(3).

(Continued)

*Primary Examiner* — Timothy A Mudrick
(74) *Attorney, Agent, or Firm* — Tutunjian & Bitetto, P.C.; Randall Bluestone

(57) ABSTRACT

Fluid motion is simulated by performing a first fluid simulation without reflecting all of a plurality of forces acting on a fluid, to obtain a first velocity of the fluid at a current time step; estimating a velocity residue at the current time step by inputting a calculated velocity from the previous time step into a regression model. The regression model is trained to relate velocity obtained by performing a second fluid simulation reflecting the plurality of forces acting on the fluid to a difference between the velocity obtained by performing the first fluid simulation and the velocity obtained by performing the second fluid simulation; and calculating a velocity of the fluid at the current time step by adding the first velocity at the current time step and the velocity residue at the current time step.

20 Claims, 6 Drawing Sheets

(56) References Cited

OTHER PUBLICATIONS

Koshizuka, Seiichi, et al., "Moving-particle semi-implicit method for fragmentation of incompressible fluid," Nuclear science and engineering, Jul. 1996, pp. 421-434, 123(3).
Jeong, Sohyeon, et al., "Data-driven fluid simulations using regression forests," ACM Transactions on Graphics (TOG), Nov. 2015, 9 pages, 34(6).
Cummins, Shaken J., et al., "An SPH projection method," Journal of computational physics, Jul. 1999, pp. 584-607, 152(2).

\* cited by examiner $$V_t = V_{t-1} + \left( -\frac{1}{\rho}\nabla P + \nu\nabla^2 V_{t-1} + f \right)$$

$$\underbrace{\phantom{V_{t-1}}}_{202} \quad \underbrace{\phantom{-\frac{1}{\rho}\nabla P + \nu\nabla^2 V_{t-1}}}_{201} \quad \underbrace{\phantom{f}}_{202}$$

| | | d | | | | | | |
|---|---|---|---|---|---|---|---|---|
| $u_1$ | ... | $u_{t-d}$ | $u_{t-d+1}$ | ... | $u_{t-1}$ | $u_t$ | $u_{t+1}$ | ... |
| $V_1$ | ... | $V_{t-d}$ | $V_{t-d+1}$ | ... | $V_{t-1}$ | $V_t$ | $V_{t+1}$ | ... |
| $\Delta V_1$ | ... | $\Delta V_{t-d}$ | $\Delta V_{t-d+1}$ | ... | $\Delta V_{t-1}$ | $\Delta V_t$ | $\Delta V_{t+1}$ | ... |

FIG. 3

MACHINE LEARNING BASED FLUID SIMULATION

BACKGROUND

Technical Field

The present invention relates to machine learning based fluid simulation.

Description of the Related Art

The motion of fluids has been modeled by laws and theories of physics, such as the Navier Stokes equations. Since such equations are sometimes too complex to solve, there has been no analytical solution found for the equations. Some solvers, such as Smoothed-Particle Hydrodynamics (SPH) and the Moving Particle Semi-implicit (MPS) method, have been utilized for practical fluid simulations. However, these solvers require large computational resources.

SUMMARY

According to an aspect of the present invention, a computer-implemented method is provided that includes performing a first fluid simulation without considering all of a plurality of forces acting on a fluid, to obtain a first velocity of the fluid at a current time step; and estimating a velocity residue at the current time step by inputting at least a calculated velocity from the previous time step into a regression model. The regression model is trained to relate velocity obtained by performing a second fluid simulation considering the plurality of forces acting on the fluid to a difference between the velocity obtained by performing the first fluid simulation and the velocity obtained by performing the second fluid simulation. Additionally the method calculates a velocity of the fluid at the current time step by adding the first velocity at the current time step and the velocity residue at the current time step.

The foregoing aspect can also include an apparatus configured to perform the computer-implemented method, and a computer program product storing instructions embodied on a computer-readable medium or programmable circuitry, that, when executed by a processor or the programmable circuitry, cause the processor or the programmable circuitry to perform the method. The summary clause does not necessarily describe all features of the embodiments of the present invention. Embodiments of the present invention can also include sub-combinations of the features described above.

BRIEF DESCRIPTION OF THE DRAWINGS

FIG. 2 shows a first velocity and a second velocity according to an embodiment of the present invention.

FIG. 3 shows first velocities, second velocities, and velocity residues for time steps according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
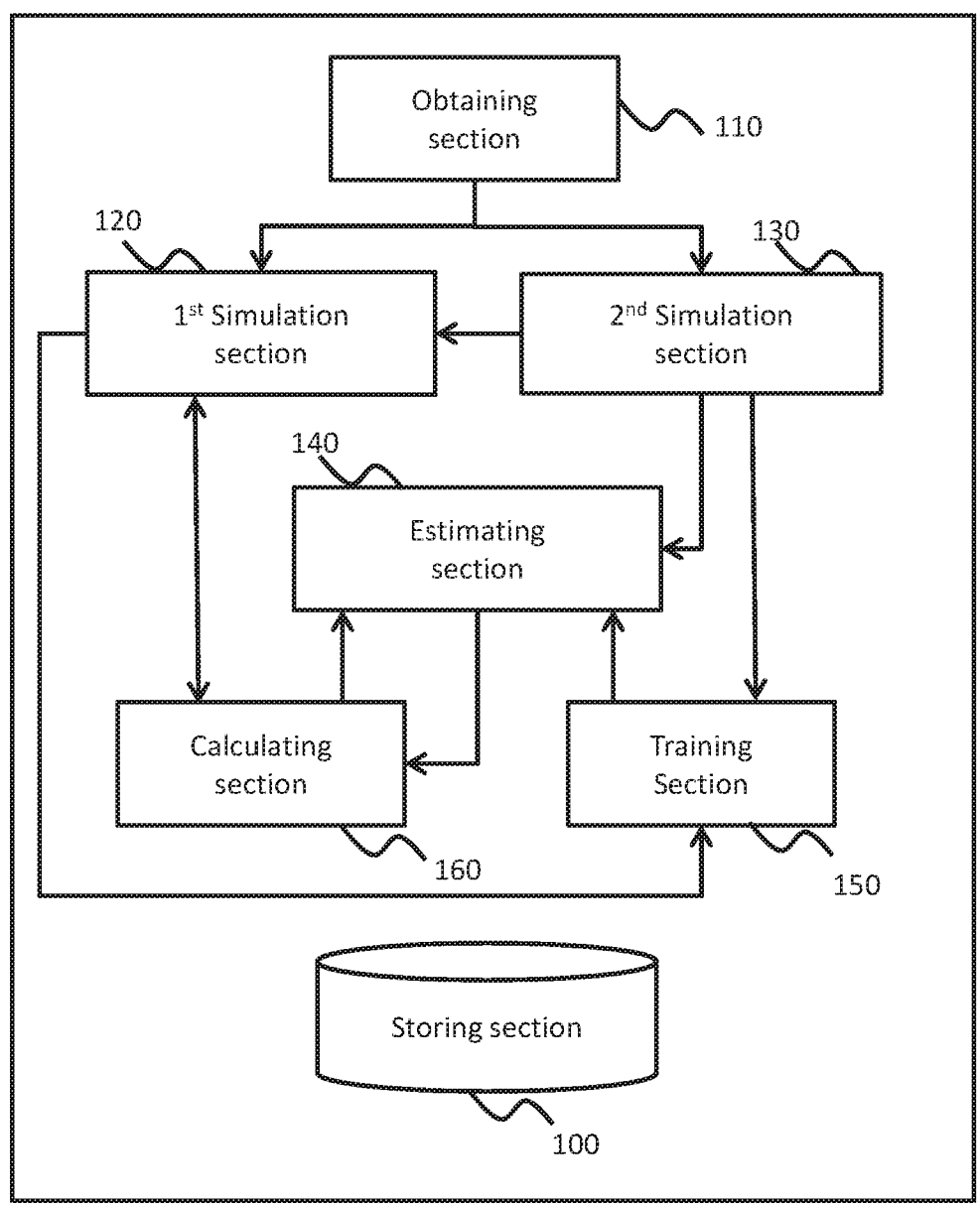
FIG. 1 shows an exemplary configuration of an apparatus 10, according to an embodiment of the present invention.

FIG. 1 shows an exemplary configuration of an apparatus 10, according to an embodiment of the present invention. The apparatus 10 can simulate fluid motion by utilizing a simplified fluid flow model in which not all of the forces acting on the fluid are considered. Thereby the apparatus 10 can perform the simulation much faster and/or with less computational resources.

The apparatus 10 can include a processor and/or programmable circuitry. The apparatus 10 can further include one or more computer readable mediums collectively including instructions. The instructions can be embodied on the computer readable medium and/or the programmable circuitry. The instructions, when executed by the processor or the programmable circuitry, can cause the processor or the programmable circuitry to operate as a plurality of operating sections.

Thereby, the apparatus 10 can be regarded as including a storing section 100, an obtaining section 110, a first simulation section 120, a second simulation section 130, an estimating section 140, a training section 150, and a calculating section 160.

The storing section 100 stores information used for the processing that the apparatus 10 performs. The storing section 100 can also store a variety of data/instructions used for operations of the apparatus 10. One or more other elements in the apparatus 10 (e.g., the obtaining section 110, the first simulation section 120, the second simulation section 130, the estimating section 140, the training section 150, and the calculating section 160) can communicate data directly or via the storing section 100, as necessary.

The storing section 100 can be implemented by a volatile or non-volatile memory of the apparatus 10. In some embodiments, the storing section 100 can store neural networks, parameters, and other data related thereto.

The obtaining section 110 obtains simulation conditions, such as initial positions and initial velocity of fluid, boundary conditions, and other parameters needed for the simulations. The obtaining section 110 can obtain other data necessary for operations of the apparatus 10. The obtaining section 110 can provide the first simulation section 120 and the second simulation section 130 with the simulation conditions.

The first simulation section 120 performs a first fluid simulation without considering all of a plurality of forces acting on the fluid. In an embodiment, the plurality of forces acting on the fluid can correspond to forces described in the Navier Stokes equations, as explained below.

In an embodiment, the first simulation section 120 can calculate at least velocity of fluid at a plurality of time steps of the first fluid simulation by using at least a part of the plurality of forces acting on the fluid. Thereby, the first simulation section 120 can obtain a first velocity of the fluid at each time step. The first simulation section 120 can also calculate positions of the fluid at a plurality of time steps.

The first simulation section 120 can perform the first fluid simulation by using the simulation conditions. In an embodiment, the first fluid simulation can be one of particle-based and grid-based. The first simulation section 120 can provide the training section 150 and the calculating section 160 with the first velocity.

The second simulation section 130 performs a second fluid simulation by considering the plurality of forces acting on the fluid. In an embodiment, the second simulation section 130 can calculate velocity and position of the fluid at the plurality of time steps of the second fluid simulation by using the plurality of forces acting on the fluid. Thereby, the second simulation section 130 can obtain a velocity of the fluid at each time step. The velocity obtained in the second fluid simulation can be referred to as a "second velocity."

The second simulation section 130 can perform the second fluid simulation by using the simulation conditions. In an embodiment, the second fluid simulation can be one of particle-based and grid-based, so that the second fluid simulation can be the same basis as the first fluid simulation. The second simulation section 130 can provide the estimating section 140 and the training section 150 with the second velocity.

FIG. 2 shows a first velocity and a second velocity according to an embodiment of the present invention. The second simulation section 130 can calculate the second velocity using the Navier Stokes equations. In an embodiment, the second simulation section 130 can calculate a second velocity $V_t$ at a current time step t by considering a first force term 201 and a second force term 202 based on a second velocity $V_{t-1}$ at a previous time step t−1.

In the embodiment, the first force term 201 can correspond to pressure acting on the fluid and deviatoric stress acting on the fluid. In the embodiment, the second force term 202 can correspond to external forces acting on the fluid (such as gravity, Coriolis force, etc.). FIG. 2 indicates that the second velocity $V_t$ is calculated based on all forces (e.g., pressure, deviatoric stress, and external force) acting on the fluid in the Navier Stokes equations.

The first simulation section 120 can calculate a first velocity by using one or more portions of the Navier Stokes equations. In an embodiment, the first simulation section 120 can calculate a first velocity $u_t$ at a current time step t by considering only the second force term 202 based on a second velocity $V_{t-1}$ at a previous time step t−1. FIG. 2 indicates that the first velocity $u_t$ is calculated based on only some of the forces (e.g., external force) acting on the fluid in the Navier Stokes equations.

The estimating section 140 can estimate a velocity residue at the current time step by inputting at least a calculated velocity from the previous time step into a regression model. In an embodiment, a calculated velocity can include at least a plurality of velocities of the fluid at consecutive previous time steps.

The velocity residue can correspond to an estimated difference between the first velocity and the second velocity of the fluid. As explained in relation to the training section 150, the regression model can input one or more preceding velocities and output an estimated difference between the second velocity and the first velocity, referred to as the velocity residue.

In an embodiment, the estimating section 140 can estimate the velocity residue $\Delta V'_t$ at the current time step t by $\Delta V'_t = \varphi(V_{[t-d:t-1]})$, where is $\varphi$ is a regression model to output $\Delta V'_t$, and d is a number of "previous time steps" input to the regression model. The estimating section 140 can provide the calculating section 160 with the velocity residue.

The training section 150 can train the regression model such that the model can be used by the estimating section 140. The training section 150 can train the regression model so as to relate a second velocity obtained by performing a second fluid simulation to a difference between the first velocity obtained by performing the first fluid simulation and the second velocity obtained by performing the second fluid simulation. The training section 150 can provide the estimating section 140 with the regression model.

The calculating section 160 can calculate a corrected velocity of the fluid at the current time step by using the first velocity and the velocity residue at the current time step. In an embodiment, the calculating section 160 can calculate the corrected velocity of the fluid $V'_t$ at the current time step t by $V'_t = \Delta V'_t + u_t$.

FIG. 3 shows a first velocity $u_t$, a second velocity $V_t$, and a difference $\Delta V_t$ between the first velocity and the second velocity for each time step according to an embodiment of the present invention. For a training phase, the first simulation section 120 can calculate first velocities $u_1, u_2, \ldots u_t, u_{t+1}$ at time steps 1, 2, ..., t, t+1. The second simulation section 130 can also calculate second velocities $V_1, V_2, \ldots V_t, V_{t+1}$ at time steps 1, 2, ..., t, t+1.

The training section 150 can obtain differences $\Delta V_1, \Delta V_2, \ldots \Delta V_t, \Delta V_{t+1}$ by calculating $V_1-u_1, V_2-u_2, \ldots V_t-u_t, V_{t+1}-u_{t+1}$. The training section 150 can train a regression model relating d preceding second velocities ($V_{t-d}, V_{t-d+1}, \ldots V_{t-1}$) to the difference $\Delta V_t$. The estimating section 140 can use the regression model to estimate a velocity residue $\Delta V'_t$ at current time step t upon an input of d preceding velocities ($V'_{t-d}, V'_{t-d+1}, \ldots V'_{t-1}$) calculated by the calculating section 160.

Figure 4:
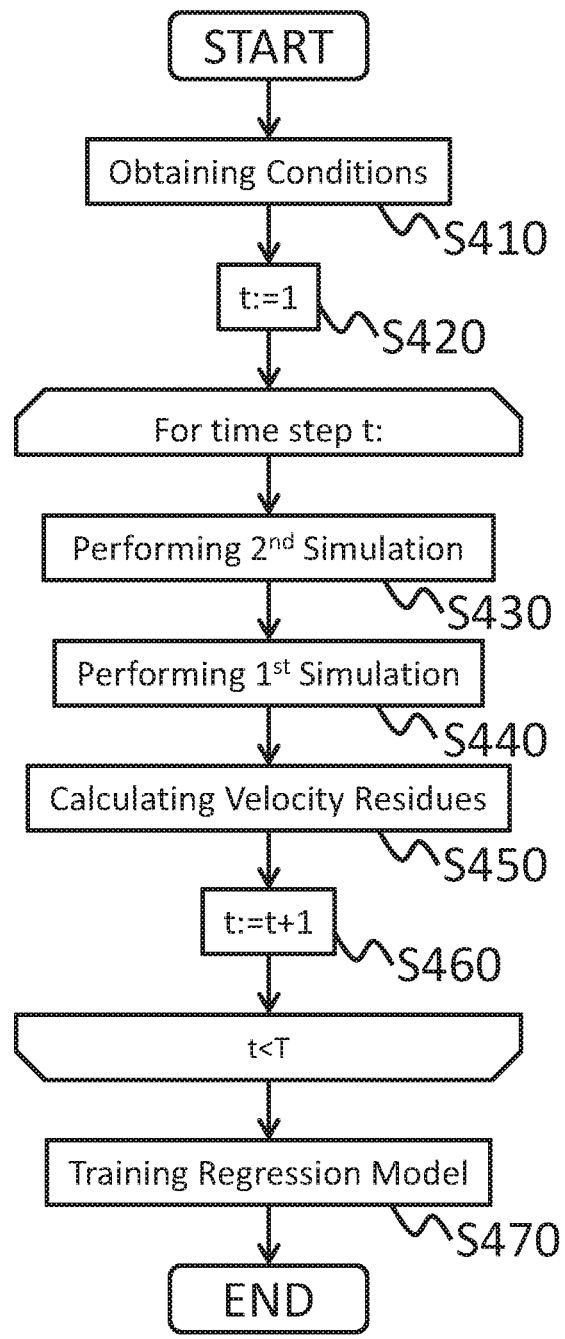
FIG. 4 shows a first operational flow according to an embodiment of the present invention.

FIG. 4 shows a first operational flow according to an embodiment of the present invention. The present embodiment describes an example in which an apparatus, such as the apparatus 10, performs operations from block S410 to block S470, as shown in FIG. 4, to train a regression model. In relation to FIGS. 4-6, embodiments where the first fluid simulation and the second fluid simulation are particle-based are explained. However, grid-based simulations can be performed in other embodiments.

At block S410, an obtaining section, such as the obtaining section 110, obtains a simulation condition needed for fluid simulation. In an embodiment, the obtaining section can obtain initial positions of particles representing the fluid, initial velocities of the particles, boundary conditions, etc. The obtaining section can provide a training section, such as the training section 150, with the simulation condition.

At block S420, a training section, such as the training section 150, sets a time step t to be 1, so that the apparatus can perform operations of block S430 to block S460 for each time step until a time step t reaches T. T can be predetermined or included in the simulation condition.

At block S430, a second simulation section, such as the second simulation section 130, performs the second fluid simulation. The second simulation section can update position and velocity of particles in the fluid. In an embodiment, the second simulation section can calculate the second velocity $V_t$ of the fluid by using the position of the fluid $X_t$ at the current time step t for each particle in the fluid. The second simulation section can use the boundary condition for the second fluid simulation. In an embodiment, the position $X_t$ can be a position in 3D space of each particle.

In an embodiment, the second simulation section can calculate the second velocity $V_t$ by considering a plurality of forces acting on the fluid, such as pressure, deviatoric stress, and external force. In a specific embodiment, the second simulation section can calculate the second velocity $V_t$ according to the upper equation in FIG. 2 by using a known algorithm, such as SPH or MPS. The second simulation section can further calculate the position of the fluid $X_{t+1}$ at a subsequent time step t+1 by calculating $X_{t+1}=X_t+V_t\Delta t$ where $\Delta t$ is a time interval between time steps. In an embodiment, the second velocity $V_t$ can be a vector in 3D space.

At block S440, a first simulation section, such as the first simulation section 120, performs the first fluid simulation. The first simulation section can calculate velocity of the fluid. In an embodiment, the first simulation section can calculate the first velocity $u_t$ of the fluid by using the position of the fluid $X_t$ at the current time step t for each particle in the fluid. The first simulation section can use boundary condition for the first fluid simulation. In an embodiment, the first velocity $u_t$ can be a vector in 3D space.

In an embodiment, the first simulation section can calculate the first velocity $u_t$ without considering all of the plurality of forces acting on the fluid. In an embodiment, the first simulation section can calculate the first velocity $u_t$ by considering external force (e.g., gravity force) without considering at least one of pressure on the fluid and deviatoric stress on the fluid.

In a specific embodiment, the first simulation section can calculate the first velocity $u_t$ by considering only external force. In another embodiment, the first simulation section can calculate the first velocity $u_t$ by considering only (i) external force and (ii) one of pressure on the fluid and deviatoric stress on the fluid.

In a specific embodiment, the first simulation section can calculate the first velocity $u_t$ according to the lower equation in FIG. 2 by modifying a known algorithm such as SPH or MPS.

At block S450, the training section calculates a difference between the first velocity and the second velocity at the current time step t. In an embodiment, the training section can calculate $\Delta V_t$ by $\Delta V_t=V_t-u_t$.

At block S460, the training section updates t by adding 1 to the current t.

At block S470, the training section trains a regression model. After the iterations of S430-S460, the training section has collected T second velocities $V_1, V_2, \ldots V_T$ and T differences $\Delta V_1, \Delta V_2, \ldots \Delta V_T$ for each of a plurality of particles in the fluid. The training section can train the regression model such that the model outputs $\Delta V_t$ at a time step t by inputting d preceding second velocities $V_{t-d}, V_{t-d+1}, \ldots V_{t-1}$.

The training section can perform the training by using known training algorithms. In an embodiment, the training section can perform the training by using a dynamic Boltzmann machine. In an embodiment, the number of output nodes in the dynamic Boltzmann machine can be the same as the number of particles in the fluid. In the embodiment, each output node in the dynamic Boltzmann machine can correspond to each of the plurality of particles in the fluid.

The training section can train the regression model with a plurality of sets of training data. In an embodiment, the apparatus can perform a plurality of sets of iterations of S420-S460 for different simulation conditions. For example, the different simulation conditions can have different initial particle positions of the fluid but can have the same particle number and the same boundary condition. Then the apparatus can train the regression model with results of the plurality of sets of the iterations.

As explained above, by performing the operations of block S410 to block S470, the apparatus can generate a regression model that estimates, from second velocities $V_{t-d}, \ldots, V_{t-1}$ at one or more previous time steps t-d, ..., t-1, a difference between the first and second velocities, which will be used as a velocity residue $\Delta V'_t$ in a fluid simulation.

Figure 5:
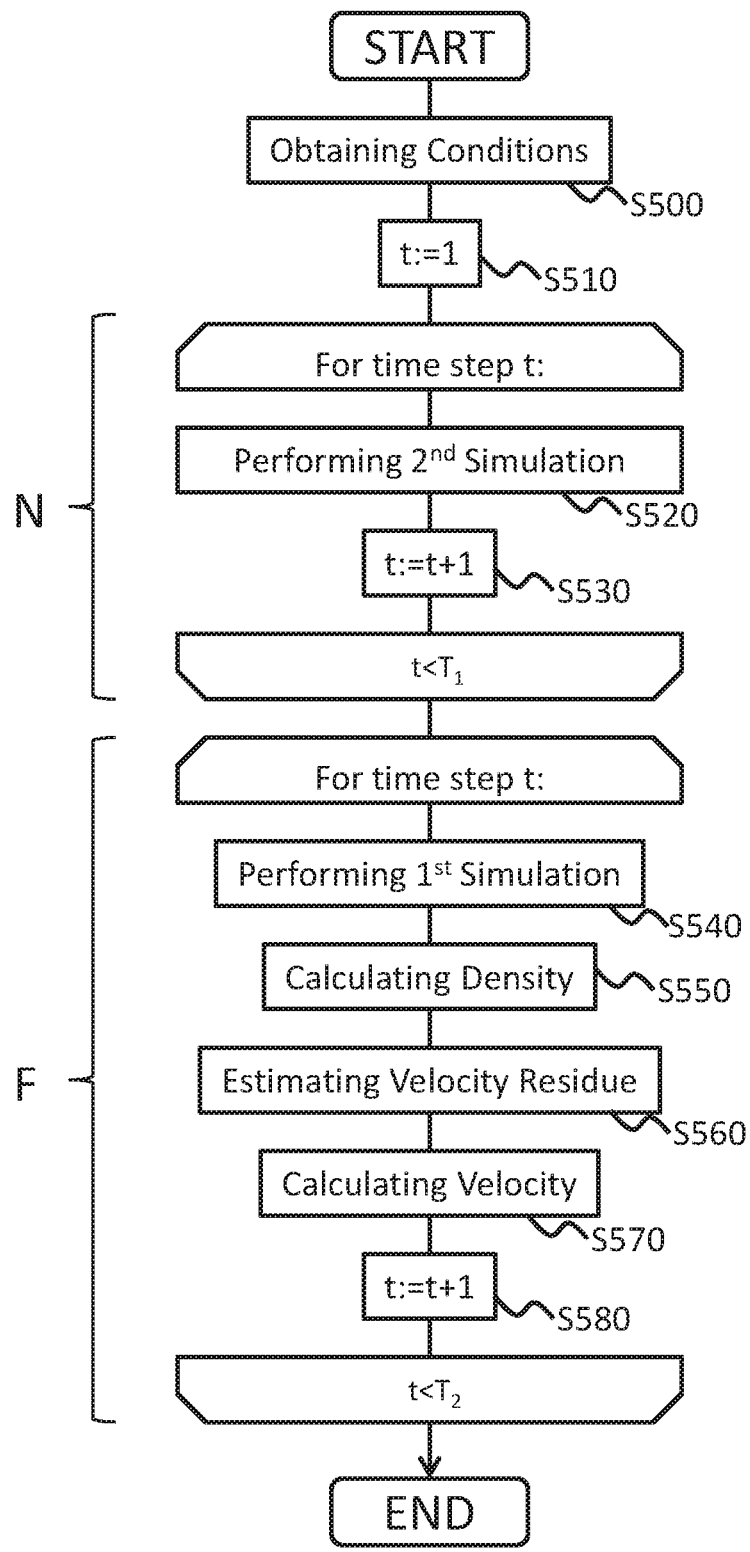
FIG. 5 shows a second operational flow according to an embodiment of the present invention.

FIG. 5 shows a second operational flow according to an embodiment of the present invention. The present embodiment describes an example in which an apparatus, such as the apparatus 10, performs operations from block S500 to block S580, as shown in FIG. 5 to perform a fluid simulation.

At block S500, an obtaining section, such as the obtaining section 110, obtains a simulation condition needed for fluid simulation. In an embodiment, the obtaining section can obtain initial positions of particles representing the fluid, initial velocities of the particles, boundary conditions, etc.

At block S510, a second simulation section, such as the second simulation section 130, sets a time step t to be 1. After block S510, a second simulation section, such as the second simulation section 130, performs operations of block S520 to block S530 (shown as "N" in FIG. 5) for each time step until a time step t reaches $T_1$. $T_1$ can be predetermined or included in the simulation condition.

At block S520, the second simulation section performs the second fluid simulation by using velocities and positions of the particles. The second simulation section can also use the simulation condition obtained at block S500. The second simulation section can perform the second fluid simulation in the same or similar manner as explained in relation to block S430.

At block S530, the second simulation section updates t by adding 1 to the current t.

After $T_1$ iterations of block S520 to block S530, a first simulation section, such as the first simulation section 120, starts a first fluid simulation including operations of block S540 to block S580. The first simulation section can start the first fluid simulation with a velocity $V_{T1}$, a position $X_{T1}$ for particles of the fluid, and the same boundary condition as the second fluid simulation. The first simulation section can also take over parameters used in the second fluid simulation, such as the simulation condition and/or one or more properties of the particles in the fluid.

The first simulation section can perform operations of block S540 to block S580 (shown as "F" in FIG. 5) for each time step until a time step t reaches $T_2$ from $T_1$. $T_2$ can be predetermined or included in the simulation condition.

At block S540, the first simulation section performs the first fluid simulation. The first simulation section can calculate velocity of the fluid. In an embodiment, the first simulation section can calculate the first velocity $u_t$ of the fluid by using the position of the fluid $X_t$ at the current time step t for each particle in the fluid. The first simulation section can use boundary conditions for the first fluid simulation.

The first simulation section can perform the first fluid simulation in the same or similar manner as explained in relation to block S440.

At block S550, a calculating section, such as the calculating section 160, calculates density of the fluid. In an embodiment, the calculating section can calculate a density around each particle of the plurality of particles in the fluid.

For example, when the fluid includes 100,000 particles, the calculating section can calculate 100,000 densities around 100,000 particles. In an embodiment, the density of each particle can be defined as a number of other particles around each particle per unit of space around the particle.

At block S560, an estimating section, such as the estimating section 140, can estimate the velocity residue by using a regression model that can be trained at the operations in FIG. 4. In an embodiment, the estimating section can input one or more velocities of the fluid calculated at previous operations of block S570 into the regression model to obtain an output of the regression model.

In a specific embodiment, the estimating section can input $V'_{t-d}, V'_{t-d+1}, \ldots, V'_{t-1}$ into the regression model φ to obtain the velocity residue $\Delta V'_t = \varphi(V'_{t-d}, V'_{t-d+1}, \ldots, V'_{t-1})$. In early phases of the first fluid simulation, at least some of $V'_{t-d}, V'_{t-d+1}, \ldots, V'_{t-1}$ can be the second velocity calculated at block S520. For example, at the first operation of block S560, $V'_{t-d}, V'_{t-d+1}, \ldots, V'_{t-1}$ can all be the second velocity $V_{t-d}, V_{t-d+1}, \ldots, V_{t-1}$ calculated at the most recent d operations of block S520. The estimating section can estimate the velocity residue for each particle in the fluid.

At block S570, a calculating section, such as the calculating section 160, calculates a corrected velocity of the fluid at the current time step by using the first velocity and the velocity residue. In an embodiment, the calculating section can calculate a sum of the first velocity $u_t$ and the velocity residue $\Delta'V_t$ as the corrected velocity $V'_t$ of the fluid at the current time step as shown by $V'_t = u_t + \Delta V'_t$.

In some embodiments, the calculating section can calculate the sum for only some of the plurality of particles in the fluid, depending on the density of each particle in the fluid. In an embodiment, the calculating section can calculate a sum of the first velocity and the velocity residue as a velocity of each particle among a plurality of particles of the fluid having a density around the particle that exceeds a threshold.

In the embodiment, the calculating section may not add the velocity residue to the first velocity of particles having a low density. For example, the calculating section can set the first velocity $u_t$ at the current time step t as the corrected velocity $V'_t$ at the current time step of a particle having a density around the particle that does not exceed a threshold.

In other words, the calculating section can correct the first velocity for only particles that have at least some density in the embodiments. Particles having low density may not be affected by pressure and deviatoric stress, and thus may not need correction relating to such forces. In the embodiments, the calculating section may avoid errors in velocity of the fluid due to unnecessary correction of velocity.

The calculating section can further update position of the fluid. In an embodiment, the calculating section can move each particle in the fluid with the calculated velocity of the each particle at the current time step. For example, the calculating section can calculate $X_{t+1} = X_t + V'_t \Delta_t$ for each particle where $\Delta_t$ is a time interval between time steps. In other embodiments, the first simulation section can update the position of the fluid at block S540 instead of the calculating section.

At block S580, the first simulation section updates t by adding 1 to the current t.

As explained above, since the apparatus can perform the first fluid simulation that does not consider all of the plurality of forces acting on the fluid and can estimate the velocity residue by using d preceding velocities $V_{t-d}, V_{t-d+1}, \ldots, V_{t-1}$, the apparatus can save computational resources and/or time without loss of accuracy for the fluid simulation. Additionally, in the embodiment of FIG. 5, the apparatus can perform the second fluid simulation for a predetermined amount of time steps (e.g., $T_1$ steps) before performing a first fluid simulation. Thereby, the apparatus may avoid propagating error in the beginning of fluid simulation.

Figure 6:
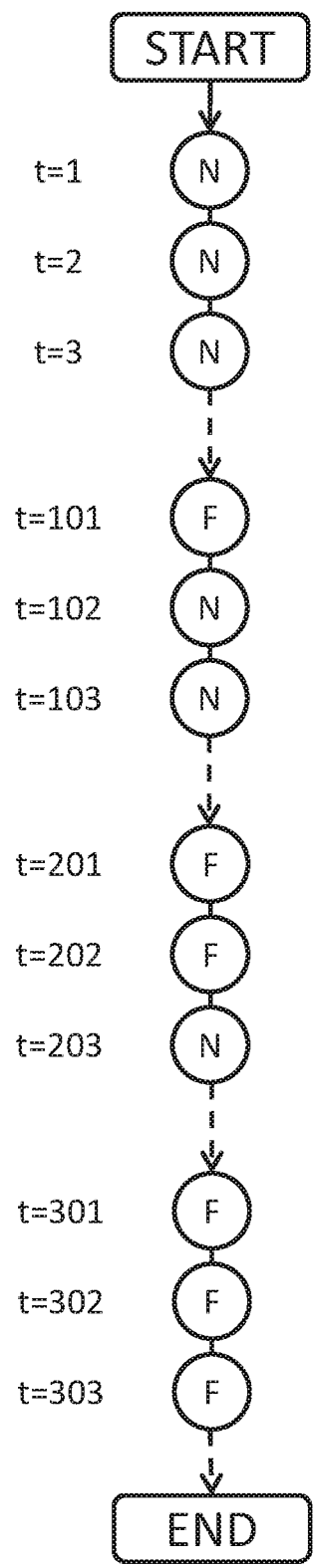
FIG. 6 shows a third operational flow according to an embodiment of the present invention.

FIG. 6 shows a third operational flow according to an embodiment of the present invention. The present embodiment describes an example in which an apparatus performs operations of N and F. N corresponds to one second fluid simulation, such as an iteration of block S520 to block S530 at one time step, and F corresponds to one first fluid simulation, such as an iteration of block S540 to block S580 at one time step in FIG. 5.

In an embodiment, the apparatus can first perform the second fluid simulation for a while, and then gradually increase a ratio of the first fluid simulation as the simulation progresses. In the embodiment of FIG. 6, the apparatus may perform only the second fluid simulation ("N") during time step t=1, . . . , 100, then perform the first fluid simulation once every 3 time steps during time step t=101, . . . , 200, then perform two first fluid simulations every 3 time steps during time step t=201, . . . , 300, and then perform only the first fluid simulation after the time step t=301.

In an embodiment, the apparatus can alternate performance of the first fluid simulation and the second fluid simulation. In an embodiment, the apparatus can perform only the first fluid simulation throughout all time steps.

In an embodiment, the apparatus can replace the first fluid simulation with the second fluid simulation when an estimated velocity residue is larger than a threshold. For example, when the estimating section determines that $\Delta V'_t$ is larger than a threshold, the second simulation section performs the second fluid simulation for the time step t and updates $V'_t$ by using a result of the second fluid simulation rather than $\Delta V'_t$. Thereby, the apparatus may avoid a potential large error caused by an overestimation error of $\Delta V'_t$.

In an embodiment, the fluid can be non-compressive or compressive.

In an embodiment, the training section can train the regression model by a training phase as explained in relation to FIG. 4. In another embodiment, the training section can train the regression model during the second fluid simulation phrase in FIG. 5. In such embodiments, the apparatus can perform iterations of block S430 to block S460 instead of iterations of block S520 to block S530, and then train the regression model in a manner explained in S470 before iterations of block S540 to block S580.

The apparatus can be used for a variety of applications such as video games, chemical reaction simulation, weather forecast, and so on. For example, an embodiment of the present invention can use the calculated velocities of a fluid over a period of time to generate a fluid flow simulation as a visual element of a video game that includes e.g., flowing water. Alternatively, an embodiment of the present invention can use the calculated velocities of a fluid, such as air, over a period of time to generate a meteorological simulation for forecasting a movement of a stormfront. In other embodiments of the present invention, the calculated velocities of multiple fluids can be used to generate a simulation of a mixing of the multiple fluids, and thus the progression of one or more chemical reactions between the multiple fluids.

Various embodiments of the present invention can be described with reference to flowcharts and block diagrams whose blocks can represent (1) steps of processes in which operations are performed or (2) sections of apparatuses responsible for performing operations. Certain steps and sections can be implemented by dedicated circuitry, programmable circuitry supplied with computer-readable instructions stored on computer-readable media, and/or processors supplied with computer-readable instructions stored on computer-readable media. Dedicated circuitry can include digital and/or analog hardware circuits and can include integrated circuits (IC) and/or discrete circuits. Programmable circuitry can include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
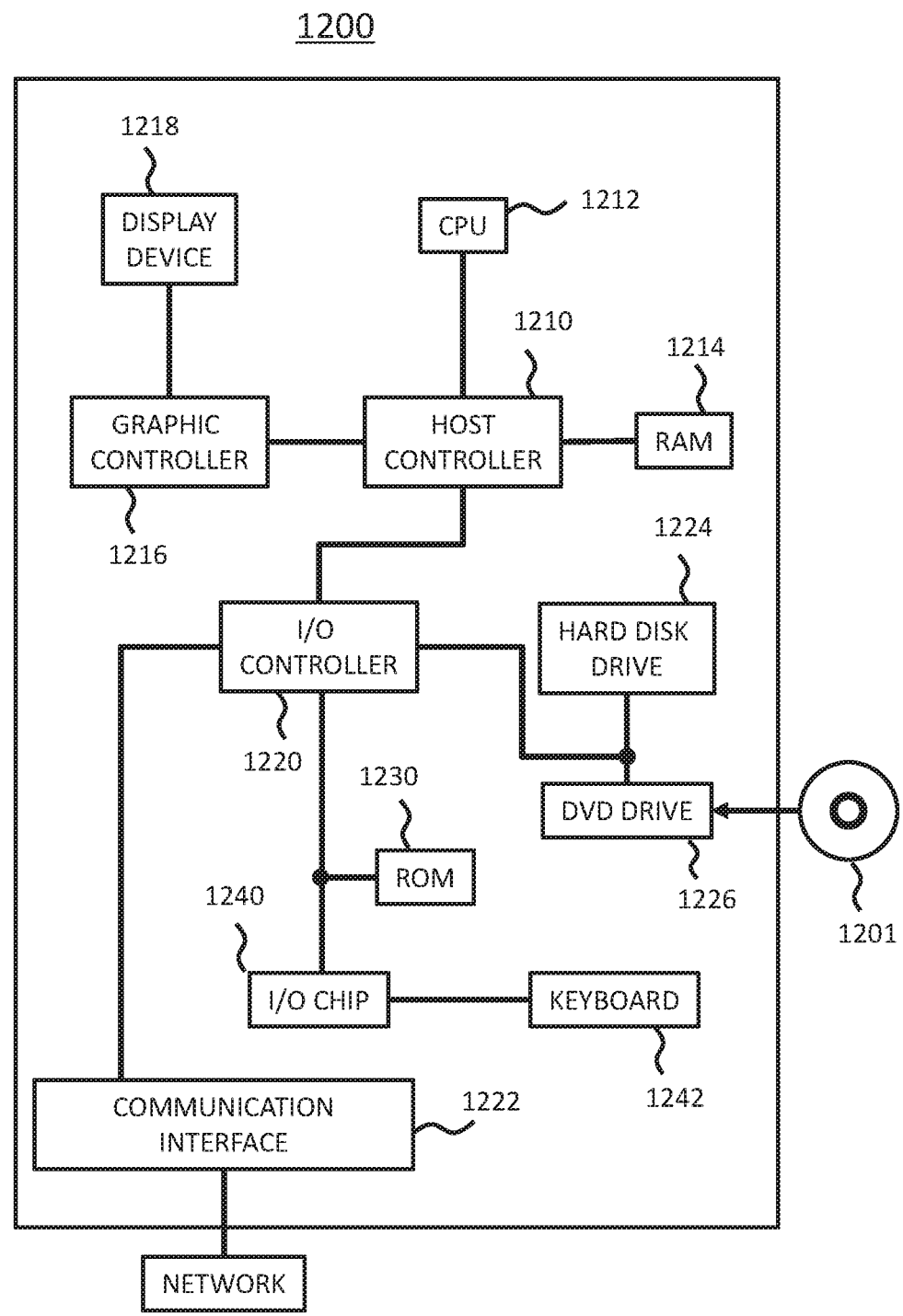
FIG. 7 shows an exemplary hardware configuration of a computer that functions as a system, according to an embodiment of the present invention.

FIG. 7 shows an example of a computer 1200 in which aspects of the present invention can be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program can be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 can also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method can be constituted by realizing the operation or processing of information in accordance with the usage of the computer 1200.

For example, when communication is performed between the computer 1200 and an external device, the CPU 1212 can execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 can cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 can then write back the processed data to the external recording medium.

Various types of information, such as various types of programs, data, tables, and databases, can be stored in the recording medium to undergo information processing. The CPU 1212 can perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 can search for information in a file, a database, etc., in the recording medium. For example, when a plurality of entries, each having an attribute value of a first attribute associated with an attribute value of a second attribute, are stored in the recording medium, the CPU 1212 can search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules can be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method for fluid simulation, comprising:
generating a first fluid simulation reflecting a subset of forces selected from a plurality of forces acting on a fluid, to obtain a first velocity of the fluid at a current time step;

generating a second fluid simulation reflecting the plurality of forces acting on the fluid at previous time steps to obtain a second velocity;

estimating a velocity residue at the current time step by inputting at least the second velocity from one of the previous time steps into a regression model, the regression model trained to relate the second velocity obtained from the second fluid simulation to a difference between the first velocity and the second velocity;

calculating a corrected velocity of the fluid at the current time step by adding the first velocity at the current time step and the velocity residue at the current time step; and generating a corrected fluid simulation from the calculated corrected velocity.

2. The method of claim 1, wherein calculating the corrected velocity of the fluid, comprises:

calculating a sum of the first velocity and the velocity residue.

3. The method of claim 2, wherein calculating the corrected velocity of the fluid, comprises:

calculating a sum of the first velocity and the velocity residue as a velocity of each particle among a plurality of particles of the fluid having a density around the particle that exceeds a threshold.

4. The method of claim 1, wherein estimating the velocity residue, comprises: using at least a plurality of second velocities of the fluid at consecutive previous time steps.

5. The method of claim 1, wherein estimating the velocity residue is performed using a dynamic Boltzmann machine.

6. The method of claim 1, wherein generating the first fluid simulation comprises: considering at least an external force and not considering at least one of pressure on the fluid and deviatoric stress on the fluid in Navier Stokes equations.

7. The method of claim 6, wherein the external force comprises a gravity force acting on the fluid.

8. The method of claim 1, wherein generating the first fluid simulation includes using a boundary condition.

9. The method of claim 1, further comprising: generating the second fluid simulation for a predetermined amount of time steps before generating the first fluid simulation.

10. The method of claim 1, wherein generating the first fluid simulation and generating the second fluid simulation are one of particle-based and grid-based.

11. The method of claim 1, further comprising: training the regression model so as to input the second velocity and output a difference between the first velocity and the second velocity.

12. An apparatus comprising a processor or a programmable circuitry; and one or more computer readable mediums collectively including instructions that, when executed by the processor or the programmable circuitry, cause the processor or the programmable circuitry to:

generate a first fluid simulation reflecting a subset of forces selected from a plurality of forces acting on a fluid, to obtain a first velocity of the fluid at a current time step;

generate a second fluid simulation reflecting the plurality of forces acting on the fluid at previous time steps to obtain a second velocity;

estimate a velocity residue at the current time step by inputting at least the second velocity from one of the previous time steps into a regression model, the regression model trained to relate the second velocity obtained from the second fluid simulation to a difference between the first velocity and the second velocity;

calculate a corrected velocity of the fluid at the current time step by adding the first velocity at the current time step and the velocity residue at the current time step; and generate a corrected fluid simulation from the calculated corrected velocity.

13. The apparatus of claim 12, wherein the one or more computer readable mediums further include instructions that, when executed cause the processor or the programmable circuitry to calculate the corrected velocity of the fluid from at least a sum of the first velocity and the velocity residue.

14. The apparatus of claim 13, wherein the one or more computer readable mediums further include instructions that, when executed cause the processor or the programmable circuitry to calculate the corrected velocity of the fluid from at least a sum of the first velocity and the velocity residue as a velocity of each particle among a plurality of particles of the fluid having a density around the particle that exceeds a threshold.

15. The apparatus of claim 12, wherein the one or more computer readable mediums further include instructions that, when executed cause the processor or the programmable circuitry to estimate the velocity residue by using at least a plurality of second velocities of the fluid at consecutive previous time steps.

16. The apparatus of claim 12, wherein a dynamic Boltzmann machine is used to estimate the velocity residue.

17. A computer program product including one or more computer readable storage mediums collectively storing program instructions that are executable by a processor or programmable circuitry to cause the processor or programmable circuitry to perform operations comprising:

generating a first fluid simulation reflecting a subset of forces selected from a plurality of forces acting on a fluid, to obtain a first velocity of the fluid at a current time step;

generating a second fluid simulation reflecting the plurality of forces acting on the fluid at previous time steps to obtain a second velocity;

estimating a velocity residue at the current time step by inputting at least the second velocity from one of the previous time steps into a regression model, the regression model trained to relate the second velocity obtained from the second fluid simulation to a difference between the first velocity and the second velocity;

calculating a corrected velocity of the fluid at the current time step by adding the first velocity at the current time step and the velocity residue at the current time step; and generating a corrected fluid simulation from the calculated corrected velocity.

18. The computer program product of claim 17, wherein calculating the corrected velocity of the fluid, comprises: calculating a sum of the first velocity and the velocity residue.

19. The computer program product of claim 18, wherein calculating the corrected velocity of the fluid, comprises: calculating a sum of the first velocity and the velocity residue as a velocity of each particle among a plurality of particles of the fluid having a density around the particle that exceeds a threshold.

20. The computer program product of claim 17, wherein estimating the velocity residue, comprises: using at least a plurality of second velocities of the fluid at consecutive previous time steps.

* * * * *